(12) United States Patent
You

(10) Patent No.: US 6,200,062 B1
(45) Date of Patent: Mar. 13, 2001

(54) FURNITURE COMBINATION WITH CONNECTOR DEVICE

(75) Inventor: Yuh-Shu You, Chang Hua Hsien (TW)

(73) Assignee: Changhua Chang Yee Industrial Co., Ltd., Chang Hua Hsien (TW)

( * ) Notice: Subject to any disclaimer, the term of this patent is extended or adjusted under 35 U.S.C. 154(b) by 0 days.

(21) Appl. No.: 09/119,758

(22) Filed: Jul. 21, 1998

(51) Int. Cl.⁷ .................................................... F16B 9/02
(52) U.S. Cl. ........................................ 403/381; 403/230
(58) Field of Search ................................. 403/381, 331, 403/324, 230, 231; 312/263, 265.5; 248/223.41

(56) References Cited

U.S. PATENT DOCUMENTS

| | | | | |
|---|---|---|---|---|
| 2,793,407 | * | 5/1957 | Johntson | 403/381 X |
| 3,090,086 | * | 5/1963 | Fata | 403/381 |
| 3,547,472 | * | 12/1970 | Ehrman | 403/381 |
| 4,014,618 | * | 3/1977 | Kristiansen | 403/231 X |

FOREIGN PATENT DOCUMENTS

| | | | | |
|---|---|---|---|---|
| 3842051 | * | 12/1989 | (DE) | 403/381 |
| 1283917 | * | 1/1962 | (FR) | 403/381 |
| 2258775 | * | 8/1975 | (FR) | 403/381 |
| 4-046210 | * | 2/1992 | (JP) | 403/331 |

\* cited by examiner

*Primary Examiner*—Harry C. Kim
(74) *Attorney, Agent, or Firm*—Harrison & Egbert

(57) ABSTRACT

A furniture combination with connector device is provided with a connector installed at the connection of the furniture combination by the elements of binding and wedge, such as to install on the chair, table, and the cupboard. The binding and the wedge can be installed separately at the opposite location of the furniture. The binding is formed of concave shape providing with the wedge trough, and the wedge is formed convex shape providing with the wedge convex body that is complementary engaged with the wedge trough. The wedge trough has provided with an obliquity, so as to let the furniture elements can be fixed very steady in combination.

2 Claims, 3 Drawing Sheets

FURNITURE COMBINATION WITH CONNECTOR DEVICE

FIELD OF THE INVENTION

The present invention relates generally to furniture, and more particularly to a furniture combination with connector device.

BACKGROUND OF THE INVENTION

As shown in FIG. 1, the conventional furniture as we see generally in daily life such as a chair, a table, a cupboard is integrally formed as the finished product. Owing to the huge volume of the fixed finished product, it is inconvenient to move in transportation, and it is easy to damage the appearance of the furniture when unloaded. Also, it is not cost—effective for shipment or packaging.

SUMMARY OF THE INVENTION

The primary objective of the present invention is therefore to provide a furniture combination with connector device that is cost—effective and which allows the user to assemble the furniture.

In keeping, with the principle of the present invention, the foregoing objective of the present invention is attained by a combined hole or a decision place, then further attained by relevant lock elements such as a screw, and a nut so that the users can fix and lock the product according to the structure device.

The foregoing objective, features, functions, and advantages of the present invention will be more readily understood upon a thoughtful deliberation of the following detailed description of the present invention with reference to the accompanying drawings.

DETAILED DESCRIPTION OF THE EMBODIMENT

Figure 2:
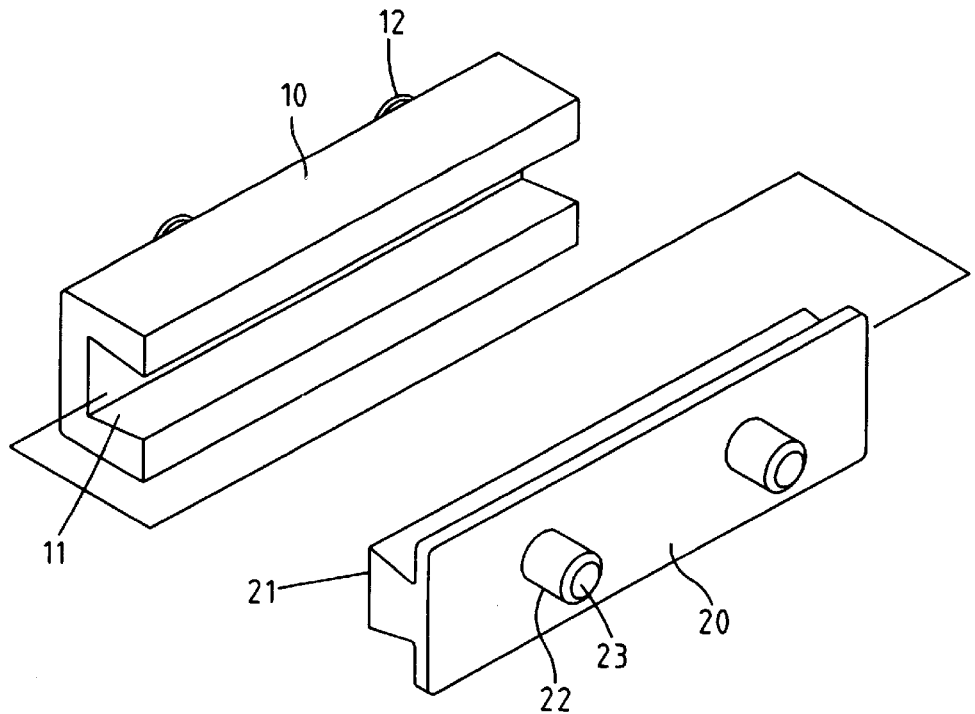
FIG. 2 shows a perspective view of the present invention.

As shown in FIG. 2, a furniture combination with connector device embodied in the present invention is composed of a binding member 10 and a wedge member 20.

The binding member 10 is formed as a rectangle and provided with a wedge trough 11 along the length of the binding member 10. The back side of the binding member 10 is provided with a pin member 12, which has a hole 13 at the center penetrating so as to open at the wedge trough 11.

The wedge member 20 is formed as a rectangular parallelopiped having a wedge body 21, which is formed complementary engageable with the wedge member trough 11. The back side of the wedge 20 is provided with a convex 22, which has a fixed hole 23 at the center penetrating therethrough so as to open at a surface of the wedge body 21.

With the structure member furniture combination device as described above, the binding member 10 and the wedge member 20 can be locked separately on the base and the partition of the furniture vertical connection.

Figure 1:
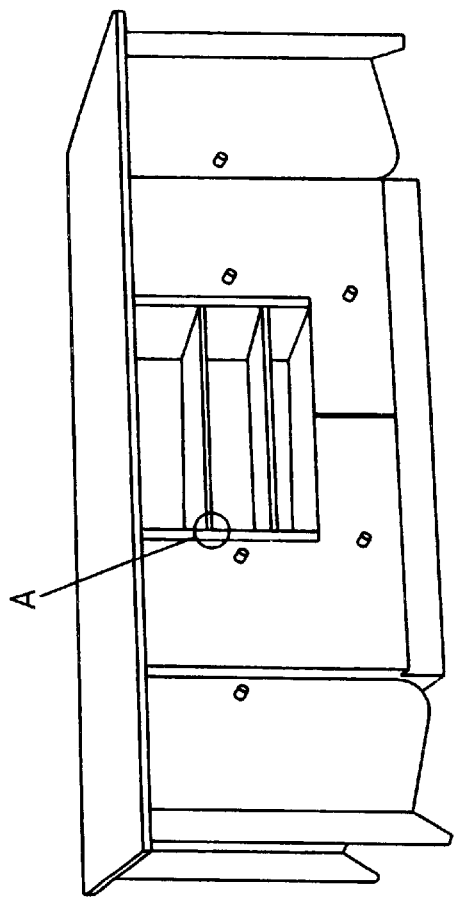
FIG. 1 shows an appearance view of the prior art furniture.
Figure 1:
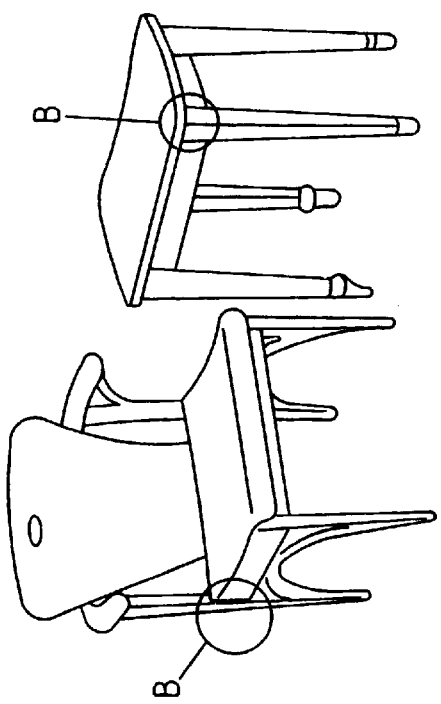
Figure 3:
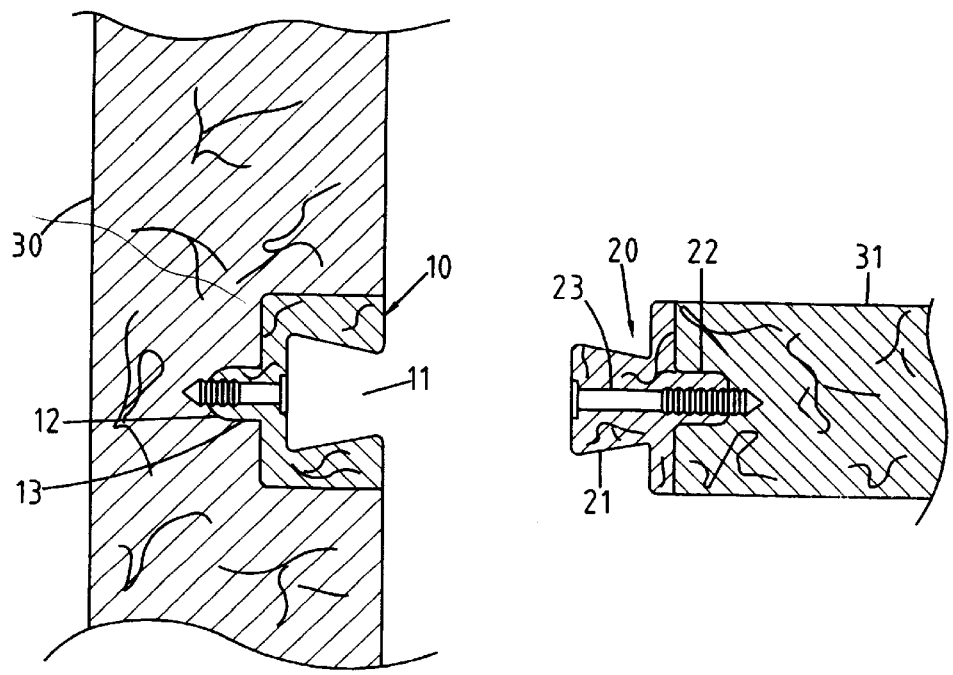
FIG. 3 shows a schematic view of the cover plate and partition of the furniture in combination.

When it is desired to combine the furniture, the present invention can be installed on the mark A as shown in FIG. 1, so as to be a vertical base of the cupboard and to be a connection between the cover plate and the partition. The binding 10 is engaged with the trough of the vertical base 30 of the furniture and locked firmly on the vertical base 30 of the furniture from the wedge trough 11 penetrated to the hole 13 by a screw (as shown in FIG. 3). The wedge member 20 is engaged with the end edge of the partition 31 (at the bottom of covers according to the using of place). The partition 31 is provided with two holes for letting the pin member 22 to insert, so that by a screw the hole 23 is locked firmly together with. The head of the screw is flush with the surface of the wedge member 20.

Figure 4:
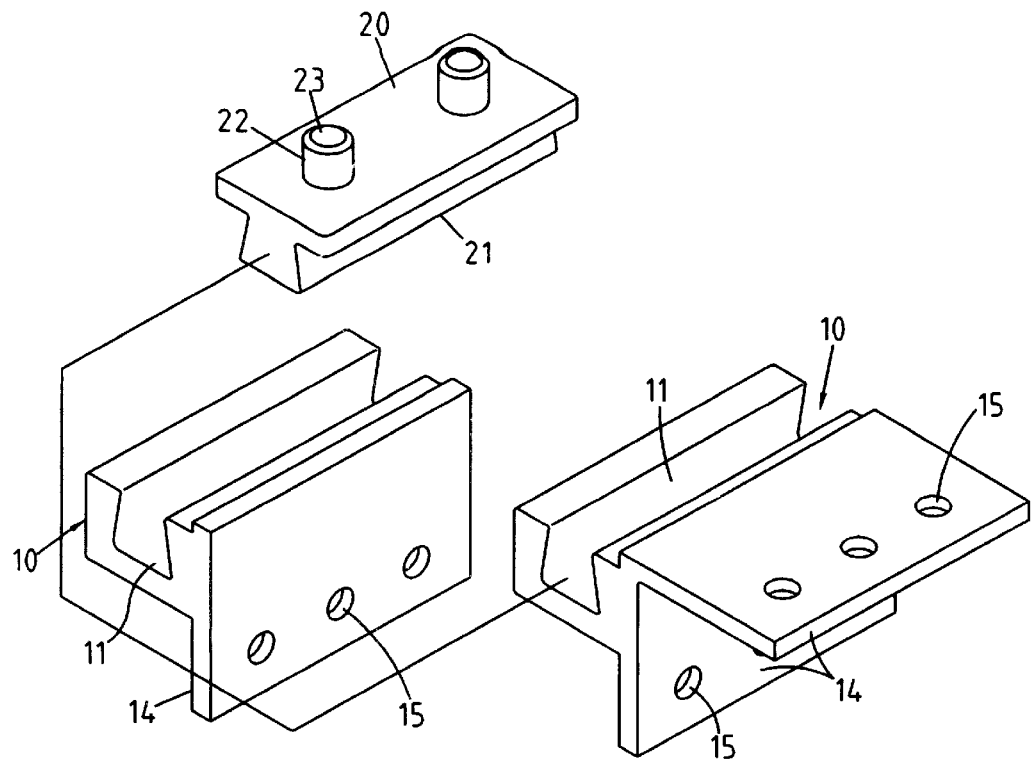
FIG. 4 shows a structure view of having a wing blade of the present invention.

As shown in FIG. 4, the binding member 10 in addition to being provided with a wedge trough 11, is further provided with a wing blade 14 at one side, and vertical two wing blades 14 at the two near sides. The wing blade 14 is provided with the holes 15.

Figures 5, 6:
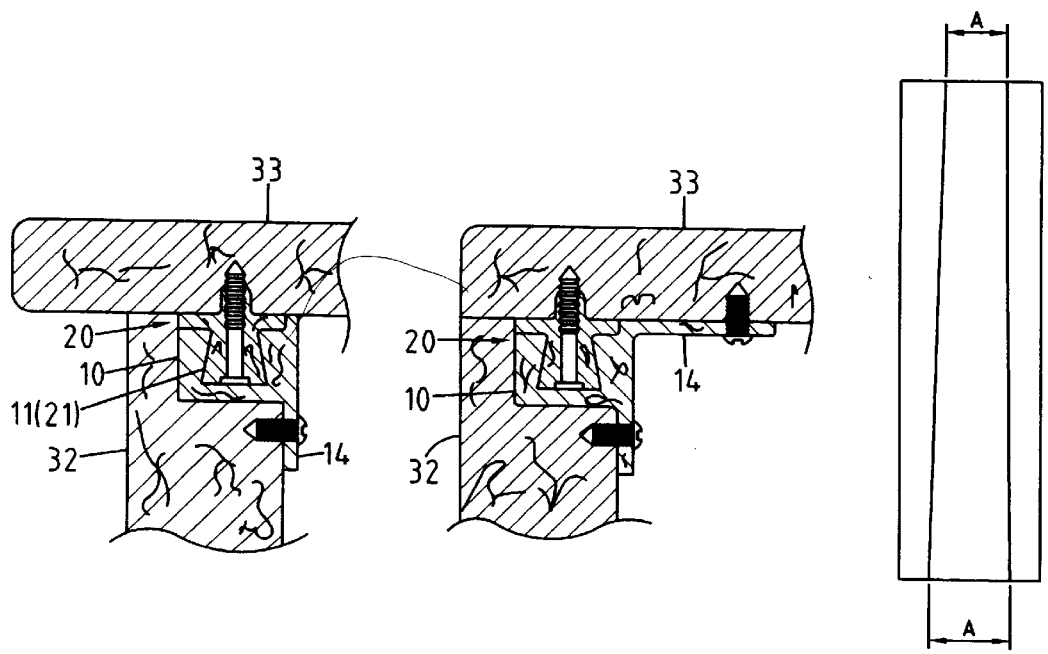
FIG. 5 shows a schematic view right angle of the present invention in combination.
FIG. 6 shows a structure view of wedge trough having an obliquity of the present invention.

The wing blade 14 of the binding member 10 and the wedge member 20 can be used together with any right angles of the furniture combination device (as shown in FIG. 1 marked B, and as shown in FIG. 5 right angle connection).

The binding member 10 is installed on the rod body 32 at one end thereof, and the wing blade 14 is locked firmly on the rod body 32. The wedge member 20 is locked on the other bottom of the rod body 33 so that the wedge body 21 of the wedge member 20 is corresponding to the wedge trough 11 of the binding member 10. Both vertical position rod bodies can be combined together with the prior installed elements of the binding member 10 and the wedge member 20. When both rod bodies are fixed together, if the binding member 10 has two wing blades 14, both rod bodies would improve fixed function by the two wing blades 14, which one is locked on the rod body 32 and other is locked on the rod body 33.

The wedge trough 11 of the binding member 10 is provided with an obliquity, which the distance front end of the wedge trough 11 is rather wide (as shown in FIG. 6), but towards back direction the distance is decreased so as to let the furniture elements be fixed very steady in combination.

The embodiment of the present invention described above is to be deemed in all respects as being illustrative and not restrictive. Accordingly, the present invention may be embodied in other specific forms without deviating from the spirit thereof. The present invention is therefore to be limited only by the scope of the following appended claims.

What is claimed is:

1. A connector device for joining furniture components together comprising:

a binding member having a generally rectangular shape, said binding member having a wedge trough extending longitudinally therethrough so as to open to a front side of said binding member, said binding member having a substantially cylindrical pin member extending outwardly from a back side thereof, said pin member having a hole extending therethrough so as to open to said wedge trough, said wedge trough having an interior surface parallel to said back side, said wedge trough having a first planar side wall and a second planar side wall extending inwardly entirely from said front side to said interior surface;

a wedge member having a rectangular parallelopiped shape, said wedge member having a wedge body extending outwardly therefrom, said wedge body being received within said wedge trough, said wedge member having front side with substantially cylindrical a pin member extending outwardly therefrom, said pin member of said wedge member having a hole extending therethrough so as to open at a back side of said wedge member, said back side of said wedge member being juxtaposed against said interior surface of said wedge trough;

a first screw extending through said hole of said pin member of said binding member so as to be engageable with one of the furniture components, said first screw having a head flush with said interior surface of said wedge trough; and a second screw extending through said hole of said pin member of said wedge member so as to be engageable with another of the furniture components, said second screw having a head flush with said back side of said wedge member.

2. The connector device of claim 1, said wedge trough extending from one end of said binding member to an opposite end of said binding member, said first planar side wall and said second planar side wall tapering from said one end of the said opposite end such that a distance between said side walls is greater at said one end than a distance between said side walls at said opposite end.

* * * * *